US012532882B2

(12) United States Patent
Storey et al.

(10) Patent No.: US 12,532,882 B2
(45) Date of Patent: *Jan. 27, 2026

(54) BIOCIDE COMPOSITION AND METHODS OF USE

(71) Applicants: William Dale Storey, Red Deer (CA); Norman L. Arrison, Red Deer (CA)

(72) Inventors: William Dale Storey, Red Deer (CA); Norman L. Arrison, Red Deer (CA)

( * ) Notice: Subject to any disclaimer, the term of this patent is extended or adjusted under 35 U.S.C. 154(b) by 495 days.

This patent is subject to a terminal disclaimer.

(21) Appl. No.: 17/868,480

(22) Filed: Jul. 19, 2022

(65) Prior Publication Data

US 2022/0354114 A1    Nov. 10, 2022

Related U.S. Application Data

(63) Continuation-in-part of application No. 16/209,463, filed on Dec. 4, 2018, now Pat. No. 11,419,332.

(60) Provisional application No. 62/594,466, filed on Dec. 4, 2017.

(51) Int. Cl.
| | | |
|---|---|---|
| *A01N 33/08* | (2006.01) | |
| *A01N 25/02* | (2006.01) | |
| *A01N 59/00* | (2006.01) | |
| *A01P 1/00* | (2006.01) | |
| *A01P 3/00* | (2006.01) | |

(52) U.S. Cl.
CPC ............ *A01N 33/08* (2013.01); *A01N 25/02* (2013.01); *A01N 59/00* (2013.01); *A01P 1/00* (2021.08); *A01P 3/00* (2021.08)

(58) Field of Classification Search
None
See application file for complete search history.

(56) References Cited

U.S. PATENT DOCUMENTS

| | | | | |
|---|---|---|---|---|
| 2007/0154621 A1* | 7/2007 | Raad | ................... | A61L 29/16 427/2.1 |
| 2011/0186462 A1* | 8/2011 | Storey | ................... | C25B 1/26 206/524.1 |
| 2012/0202721 A1 | 8/2012 | Storey et al. | | |
| 2016/0289571 A1* | 10/2016 | Storey | ................ | B01D 53/1493 |

FOREIGN PATENT DOCUMENTS

| | | |
|---|---|---|
| CA | 2968405 | 6/2016 |
| KR | 20160026392 | 3/2016 |

OTHER PUBLICATIONS

Louaileche et al., "Carbon dioxide effects on the growth and metabolites of morphological variants of *Streptococcus thermophilus*", 1993 J Dairy Sci 76:3683-3689. (Year: 1993).*
Howard et al., "Clubroot Prevention: Challenges and Opportunities," International Clubroot Workshop, Delta Edmonton South, Edmonton, AB, Jun. 21, 2013. (Year: 2013).*
Pullar JM, Vissers MC, Winterbourn CC, "Living with a killer: the effects of hypochlorous acid on mammalian cells", IUBMB Life, 50/4-5, pp. 259-266, doi: 10.1080/713803731, Oct. 2000 (Oct. 2000).
Canada Examiner's Requisition, Sep. 15, 2022.

* cited by examiner

*Primary Examiner* — Kyung S Chang
(74) *Attorney, Agent, or Firm* — Bennett Jones LLP

(57) ABSTRACT

The invention is directed to a biocidal composition formed by a reaction or combination of electrolyzed water and an amine, and methods for using same to kill or control microorganisms, such as viruses, bacteria, fungi and algae.

12 Claims, 6 Drawing Sheets

BIOCIDE COMPOSITION AND METHODS OF USE

CROSS-REFERENCE TO RELATED APPLICATION

This application claims priority to U.S. Provisional Patent Application No. 62/594,466, filed Dec. 4, 2017, the entire contents of which are incorporated herein by reference.

FIELD OF THE INVENTION

The present invention is directed to a composition comprising the reaction products of electrolyzed water and an amine, and biocidal uses of the same.

BACKGROUND OF THE INVENTION

Disinfectants or biocides are widely used in healthcare, industrial or household environments. Commonly used biocides include oxidizing biocides, alcohols, aldehydes, and surfactants.

Oxidizing biocides are general chemical oxidants. They are not selective for living organisms, but react with any oxidizable matter. However, they are microbiocidal because certain bacterial cell and viral components can react readily with them, having a higher oxidation potential than most other chemicals present in water. Three classes of oxidizing biocides are generally available for microbiocidal applications: oxidizing halogens, peroxides and ozone.

As an example of an oxidizing halogen, household bleach is commonly used as a disinfectant. Bleach is a solution of sodium hypochlorite, which interconverts with other chemical forms of free chlorine, mainly hypochlorous acid. Hypochlorous acid is believed to denature microbial proteins to kill bacteria and viruses. Another source of hypochlorous acid is electrolyzed water (also known as electrochemically activated water or anolyte) which is known to have biocidal properties due to its content of free chlorine.

Some surfactants are known to have biocidal activities. For example, quaternary ammonium compounds are non-corrosive and stable and widely used as a disinfectant.

There remains a need for biocidal agents which can be used in therapeutic, industrial or agricultural applications, which preferably have broad-spectrum activity and have limited side-effects or toxicity.

SUMMARY OF THE INVENTION

The present invention is directed a biocidal composition which comprises the reaction products of electrolyzed water and an amine, and methods for using the same in therapeutic, industrial or agricultural applications.

In one aspect, the invention may comprise a method of killing or controlling a microorganism, comprising the step of contacting the microorganism with a composition comprising a reaction product of electrolyzed water and an amine. The microorganism may comprise Gram positive bacteria such as *Bacillus*, Corynebacteria, *Clostridium, Listeria, Staphylococcus* or *Streptococcus* species, and Gram negative bacteria, excluding sulfate reducing species such as *Desulfovibrio* species. The microorganism may comprise a virus, a fungi such as plant pathogen e.g. a clubroot pathogen. Although not necessarily a microorganism, the controlled organism may comprise an algae.

In another aspect, the invention may comprise a method of controlling a plant disease caused by a fungus, comprising contacting plant seeds or a growth medium such as soil with a biocidal composition comprising a reaction product of electrolyzed water and an amine.

In another aspect, the invention may comprise a method of disinfecting a surface comprising the step of applying the biocidal composition comprising a reaction product of electrolyzed water and an amine to the surface. The biocidal composition may be heated, and in one embodiment, may be mixed with water and heated to form steam.

In another aspect, the invention may comprise a method of sanitizing a volume of fluid comprising the step of mixing the biocidal composition comprising a reaction product of electrolyzed water and an amine with the volume of fluid.

In another aspect, the invention may comprise a method of preserving a product susceptible to microbial spoilage, comprising applying a biocidal composition comprising a reaction product of electrolyzed water and an amine to the product. The product may comprise a cosmetic, pharmaceutical, nutraceutical, or an edible product intended for human or animal consumption.

DETAILED DESCRIPTION OF THE DRAWINGS

DETAILED DESCRIPTION OF PREFERRED EMBODIMENTS

Figure 1:
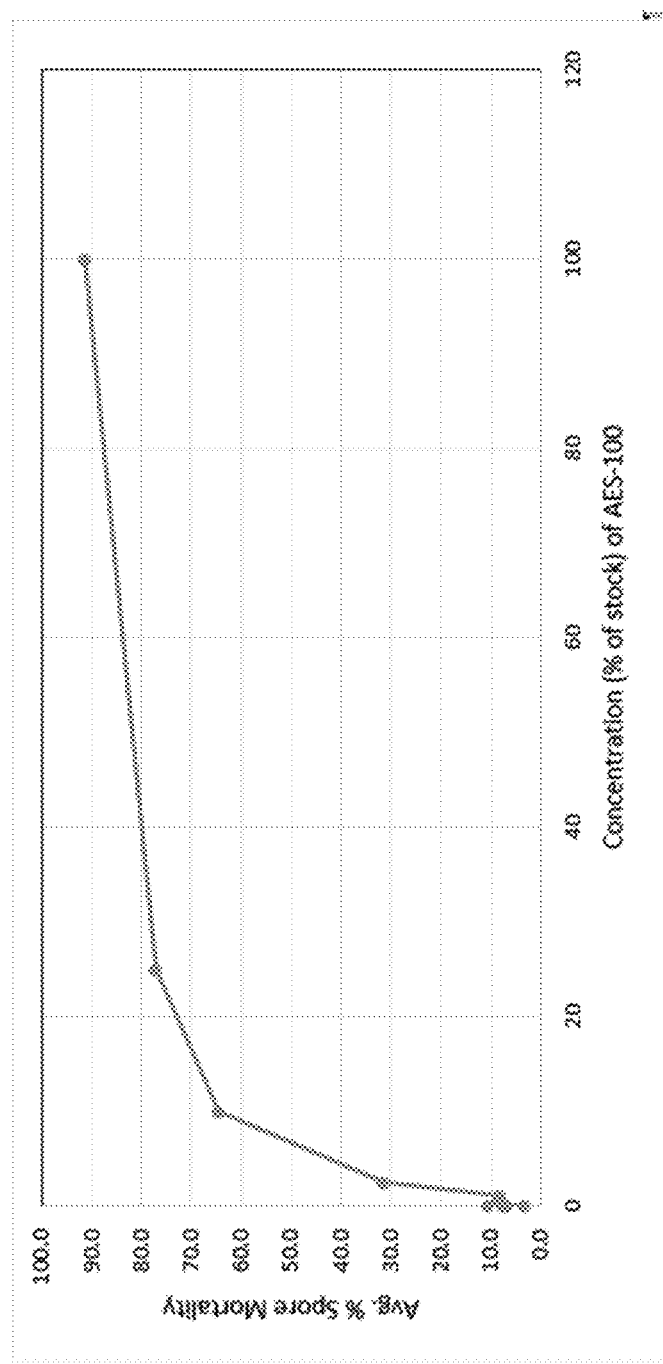
FIG. 1 shows a graph showing efficacy of a biocidal composition described herein in inactivating clubroot spores.

In one embodiment, the invention provides a biocidal composition having a broad spectrum of activity and may be effective to kill or limit the growth of microorganisms including bacteria, viruses, or fungi. Use of the biocidal composition, however, excludes use with sulfate reducing or hydrogen sulphide producing bacterial species.

In one embodiment, the biocidal composition may be mixed or diluted with water, which solution is then heated and used to steam-clean an article or an environment. The steam itself can have a sterilizing effect which may be enhanced or augmented by the biocidal composition. In particular, when the steam condenses on a surface, the biocide may be thus be deposited on the surface and remain active.

Electrolyzed water is also known as electro-activated water or electro-chemically activated water solution. It is produced by the electrolysis of ordinary water containing dissolved sodium or potassium chloride. In one embodiment, the concentration of the sodium chloride or potassium chloride is adjusted to provide a chloride concentration in the range of between about 100 ppm to about 8000 ppm. In one embodiment, the concentration of the chloride ion is about 5500 ppm, or equivalent to about 9.08 g/litre of NaCl. In another embodiment, potassium chloride is used in a concentration of about 28 g/litre.

As used herein, "anolyte" means an aqueous solution produced at the anode by the electrolysis of aqueous solutions of sodium or potassium chloride. The anolyte produced comprises free available chlorine, primarily in the form of sodium hypochlorite. In one embodiment, the anolyte comprises greater than about 8000 ppm of free available chlorine. As one skilled in the art will appreciate, the level of free chlorine is related to the amount of chlorine ions provided in the electrolyzed water. The amount of free chlorine in a sample of anolyte is known to slowly decrease over time. "Catholyte" is the aqueous solution which is produced at the cathode.

As used herein, "electrolyzed water" means any aqueous solution which contains free available chlorine resulting from the electrolysis of water having dissolved chloride ions. It may include anolyte, or anolyte which has been mixed with catholyte. In one embodiment, the electrolyzed water comprises a mixture of about equal volumes (about 60:40 to about 40:60) of anolyte and catholyte produced from the same electrolysis.

To prepare the biocidal composition of the present invention, suitable solutions of anolyte and catholyte may be produced by an electrolysis reactor, such as that described, for example, in U.S. Pat. No. 4,875,988 to Aragon, issued Oct. 24, 1989; U.S. Pat. No. 5,540,819 to Bakhir et al., issued Jul. 30, 1996; U.S. Pat. No. 5,628,888 to Bakhir et al., issued May 13, 1997; and U.S. patent application Ser. No. 12/962,385, filed Dec. 7, 2010 (the entire contents of which are incorporated herein by reference for all purposes, where permitted). If the anode and cathode compartments are separated by a semi-permeable membrane, the composition of the anolyte and catholyte may be quite different. Typically, the anolyte is pH neutral or slightly acidic, while catholyte is basic due to the production of sodium hydroxide.

Without restriction to a theory, it is believed that anolyte does not contain chlorite ($ClO_2^-$) and chlorate ($ClO_3^-$) ions. The free available chlorine in anolyte exists primarily as hypochlorous acid (HClO) or hypochlorite ions (ClO), free chlorine ($Cl_2$) and chloride ion ($Cl^-$) and chlorine dioxide ($ClO_2$). Without restriction to a theory, it is believed that hypochlorous acid and hypochlorite ions, free chlorine, and/or chloride ions, are restricted or limited in crossing an ionomeric semi-permeable membrane. As a result, they may accumulate in the anolyte to very high levels.

In one embodiment, the anolyte is combined with the catholyte (which comprises primarily sodium or potassium hydroxide) produced at the cathode in the electrolytic process. The resulting solution still maintains a high concentration of free available chlorine and may have a pH of about 8.3 or higher. Without restriction to a theory, it is believed that the majority of the free available chlorine exists as NaHClO (sodium hypochlorite). In one embodiment, the concentration of free available chlorine is greater than about 1000 ppm in the electrolyzed water, preferably greater than about 3000 ppm, and more preferably greater than about 5500 ppm. The concentration may be as high as about 8000 ppm.

Amines may be produced through well known chemical syntheses, and are readily commercially available. As used herein, "amine" means an organic compound with one or more of the hydrogen atoms in ammonia replaced by organic groups. The term includes the three classes of amines dependent on the number of hydrogen atoms replaced, namely primary, secondary and tertiary amines. The organic groups can include aliphatic, alicyclic or aromatic groups. Examples of amines include, but are not limited to, monoethanolamine, methylamine, ethylamine, diethylamine, trimethylamine, aniline, benzylamine, and the like. In one embodiment, the amine comprises an amino alcohol such as monoethanolamine.

The biocidal composition of the present invention is prepared by combining electrolyzed water with the amine to form a reactant mixture, which then undergoes exothermic reactions or combinations. Preparation of the biocidal composition should preferably be conducted in a well-ventilated area, due to the possibility of chlorine gas production. In one embodiment, the pH of the resulting composition is in a range of about pH 11.0 or higher and may be in the range of about 12.6 to about 13.3. In one embodiment, the resulting composition does not have any detectable free available chlorine.

Once the reaction is complete, the resulting composition comprises a reaction product or combination product between at least one component of the electrolyzed water and the amine. Without restriction to a theory, it is believed that components of the reaction product combine or complex with chlorine in some manner. Without restriction to a theory, it is believed that any available chlorine is bound or otherwise rendered undetectable by the amine, or the reaction products of the composition.

It will be appreciated by those skilled in the art that the proportions of the individual components may be varied while still producing a biocidal effect of the composition to suit the treatment circumstances. In one embodiment, the proportion of the electrolyzed water to the amine solution is in an amount between about 2% to about 98% by volume based on the total volume of the reactant mixture. In a preferred embodiment, the electrolyzed water is present in an amount of about 40% to about 60% by volume based on the total volume of the biocidal composition. In one embodiment, amine is present in an amount between about 5% to about 95% by volume based on the total volume of the biocidal composition, and in a preferred embodiment, is present in an amount of about 40% by volume based on the total volume of the biocidal composition. Water or an aqueous salt solution may be used to make up volume of the reactant mixture. For example, in one embodiment, the reactant mixture may comprise 15% electrolyzed water, 10% monoethanolamine and 75% water (v:v). In another embodiment, the reactant mixture may comprise 60% electrolyzed water and 40% monoethanolamine.

The biocidal composition may be used as mixed, or may be diluted in water, an aqueous salt solution, an alcohol, a suitable solvent or mixtures thereof. In one embodiment, the biocidal composition may be used diluted in water as a 2% (v:v) solution, with effective biocidal activity on hard surfaces. The biocidal composition may be effective to kill or limit the growth of Gram positive bacteria such as *Bacillus*, Corynebacteria, *Clostridium, Listeria, Staphylococcus* or *Streptococcus* species; Gram negative bacteria such as *Salmonella, Shigella, Escherichia*, Enterobacteriaceae, *Pseudomonas, Moraxella, Helicobacter, Stenotrophomonas, Bdellovibrio*, acetic acid bacteria, *Legionella*, cyanobacteria, spirochaetes, green sulfur, and green non-sulfur bacteria.

The biocidal composition may be used in a variety of different manners. In industrial applications, it may be used to wash and disinfect various surfaces or containers. In one embodiment, the biocidal composition may be used to clean or treat sewage holding tanks, such as waste tanks for recreational vehicles or boats. Discharge or disposal of the composition after a cleaning treatment may be directly into the environment as the material has been demonstrated to be non-toxic.

The biocidal composition may be effective in a wide range of temperatures, such as from about from −50° to 250° C., and as such is effective when used in many industrial processes. In particular, the composition may be effectively used in conjunction with steam.

The biocidal composition may be added to steam make-up water for steam treatment to disinfect surfaces, and particularly large surface areas. Without restriction to a theory, the composition augments the disinfecting or cleaning action of the steam, particularly after condensation, where it is believed that the composition remains effective. Thus, the composition will be dispersed over the area which was steam treated and provide some additional or continuing biocidal effect. Examples of steam application include enclosed areas, piping, tanks and other vessels, or tank or vessel headspaces.

The biocidal composition may be added to a product as a preservative to prevent microbial growth. Such products may include foods, beverages, consumer products including personal care items such as soaps, shampoos, cosmetics, medications, solutions, industrial products or any product which requires or could benefit from a preservative additive.

In addition to its anti-bacterial properties, the inventors have demonstrated that the biocidal composition may have antiviral, anti-fungal or anti-algal properties.

The biocidal composition may also be effective to kill or limit the growth of fungi or fungi-like organisms. Fungi are eukaryotic organisms including yeasts and molds. Fungi-like organisms may include *Pythium* or *Phytophthora* species. In particular, the biocidal composition may be effective to control fungal diseases which affect agricultural operations, such as clubroot (*Plasmodiophora brassicae*), and other fungi which cause wilting, mold, rust, blotches, scabs or decaying tissue on plants. Exemplary fungal diseases may include dollar spot of turfgrass, powdery mildew on ornamental plants, damping-off and root rot of beans, *botrytis* gray mold on greenhouse floral crops, scab of apple and crabapple, and Dutch elm disease. Other target fungal diseases may include Panama disease, or *Fusarium* wilt as it also known, which can affect banana, tobacco and tomato crops, or black Sigatoka disease, which is a fungal leaf spot disease.

The biocidal composition may be used in horticultural or agricultural applications, where it may be directly applied to plants, seeds or seedlings, may be incorporated into a soil or other growth medium, or may be used to treat soil or other growth medium.

In one specific application, the biocide may be effective in limiting or controlling clubroot infections. Soil or plant seeds, or both, which may harbor clubroot fungal spores may be treated with the biocide, or a dilute solution of the biocide, to kill or inactivate the fungal spores.

The biocidal composition may also be effective to kill or limit the growth of algae. As an algaecide, it may be used in lakes, ponds, pools or freshwater or saltwater aquariums to control or eliminate algae.

The biocidal composition may be considered to be effective to kill a microorganism if it kills greater than 90.0%, 95.0%, 99.0%, or preferably greater than 99.9% of the starting inoculum. The biocidal composition may be considered to be effective to control or limit the growth of a microorganism if no visible growth occurs in a growth medium under conditions where visible growth does occur in a control sample.

The biocidal or growth inhibiting effect may be determined by various tests known to those skilled in the art. For example, bactericidal or growth inhibiting effect of a specific concentration of the composition may be determined using a minimal inhibitory concentration (MIC) test or similar compendial test, which determines if the composition at a given concentration inhibits visible bacterial growth after sufficient incubation time to see bacterial growth in a control sample. Alternatively, a minimal bactericidal concentration (MBC) may be determined by determining viability of organisms after exposure to the biocide. For example, the composition may be considered effective if it kills or renders inactive greater than 99.0%, and preferably greater than 99.9% of the starting inoculum after exposure to the composition.

A biocidal composition may be considered an effective preservative, for example in a foodstuff, drink, pharmaceutical or nutraceutical, if it passes standard tests, for example the preservative challenge tests specified in United States Pharmacopeia Chapter 51, European Pharmacopeia (Ph. Eur. or EP) 5.1.3, Japanese Pharmacopeia (JP) 19, or a similar compendial test.

Exemplary embodiments of the present invention are described in the following Examples, which are set forth to aid in the understanding of the invention, and should not be construed to limit in any way the scope of the invention as defined in the claims which follow thereafter.

Example 1—Preparation of Electrolyzed Water-Amine Composition

Electrolyzed water was prepared with either sodium chloride or potassium chloride at free chlorine concentrations of 100 to 8000 ppm. In one example, NaCl at about 6 g/litre or KCl at about 7.6 g/litre was used to produce the electrolyzed water. In another example, 28 g/litre of KCl was used.

The biocide used in Examples below was prepared by mixing measured volumes of electrolyzed water (4,400 ppm-8000 ppm free available chlorine) made by combining equal volumes of anolyte and catholyte, with liquid monoethanolamine ((MEA), with less than 1% diethanolamine (DEA)), with stirring. The mixture heated up upon mixing, and was allowed to cool to room temperature before use.

In one example, Formula A was produced by mixing 60% electrolyzed water and 40% monoethanolamine (v:v) and Formula B was produced by mixing 15% electrolyzed water, 10% monoethanolamine and 75% water (v:v). Both Formula A and B were found to have no detectable chlorine and a pH of about 13.1 and about 11.6 respectively.

Example 2—Clubroot Fungus Control 2.5 g of galled root material was ground in a blender with 50 ml distilled water. The spore suspension was filtered through 8 layers of cheesecloth and the number of resting spores was determined to be $3 \times 10^8$ spores/ml by counting on a haemocytometer.

Two products, Formula A and Formula B ability to kill clubroot spores was tested at differing concentrations both at room temperature and with the products heated to 80° C. in a water bath.

1 ml of spore suspension was transferred to 1.5 ml tubes, the tubes were centrifuged and the liquid removed leaving a pellet of spores. The spore pellet was re-suspended in 1 ml of treatment and left to incubate at room temperature for 20 minutes. The tubes were centrifuged and the treatment removed, the spore pellet was washed 3 times with 1 ml distilled water and finally re-suspended in 1 ml distilled water.

50 ul of the spore suspension was removed and mixed with an equal volume of Evans blue stain and left at room temperature for 24 hrs. The stained sample was diluted 1:4 with 5% glycerol and aliquots were observed under 400× magnification. Resting spores for each treatment were observed and the results recorded, spores that appeared blue were recorded as dead while spores that had no blue colour were recorded as viable. The total number of dead and viable spores were counted in the viewing field of the microscope at three separate locations on the slide and the % mortality rate was calculated.

Resting spore mortality was unaffected in the negative control samples (distilled water) and was determined to be 100% in the positive control treatment of 2% sodium hypochlorite. Formula A was very effective at 100% concentration at room temperature with a mortality rate of 90.6%. The efficacy of the product declined at the lower concentrations tested. When Formula A was heated to 80° C. it was found to have a greater efficacy at 100% concentration with a mortality rate of 98%. The efficacy of Formula A heated to 80° C. remained high even at the lower concentrations tested with a 90% mortality rate being observed at when the product was diluted 1 in 25.

Formula B at 100% concentration at room temperature was observed to have an 85.5% mortality rate. The efficacy of the product declined at the lower concentrations tested. When Formula B was heated to 80° C. it was found to have a greater efficacy at the 100% concentration with a mortality rate of 96.4%. The efficacy of Formula B heated to 80° C. was higher at all concentrations tested compared to the product at room temperature.

Importantly, all seeds tested germinated in soils saturated with Formula A or B. With seeds placed in soils saturated with 2% sodium hypochlorite, no seeds germinated.

In a separate test, a disinfectant formula (AES-100) was prepared using NaCl electrolyzed water (8000 ppm of free available chlorine) which was mixed 60:40 with MEA. Clubroot galls were collected from canola roots. These galls were then dried and ground in a laboratory mill with a coarse screen. The ground galls were then mixed in distilled water and filtered through cheese cloth to make a spore suspension of $2.2 \times 10^8$ spores mL-1) and transferred to 5 mL tubes. These tubes were then centrifuged and the water was decanted leaving a pellet of spores. To these spore pellets 1 mL of the disinfectant was added, the spores re-suspended, and incubated at room temperature for 20 min. Subsequently, 9 mL of universal neutralizer was added to neutralize the disinfectant and then sample was centrifuged again. The spore pellet was then rinsed with sodium phosphate buffer 3 times, and then re-suspended in 5 mL of sodium phosphate buffer. Aliquots of 50 µL of spore suspension were mixed with an equal volume of Evans blue stain and left for 24 hrs at room temperature. This stained suspension was then observed under a compound microscope at 1000× magnification. One hundred resting spores were evaluated for each sample and the results recorded. Resting spores that took up the stain and appeared blue inside were scored as "dead". Treatment samples were compared with negative controls and a standard treatment (bleach) and these values were used to determine the efficacy of each disinfectant treatment.

Resting spore mortality was unaffected in the negative control (water) treatment. Sodium hypochlorite was used as a positive standard. For NaOCl, all concentrations above 1.5% resulted in 100% mortality of clubroot resting spores. The AES-100 formula was very effective at full strength or 100% concentration with 91.2% spore mortality. All concentrations above 20% resulted in greater than 70% spore mortality.

Example 3—Anti-Bacterial Effectiveness

Bacterial test strains (*Pseudomonas aeruginosa* (ATCC 15442), *Staphylococcus aureus* (ATCC 6538) and *Streptococcus pneumoniae* (ATCC 49619)) were grown overnight and a bacterial cell suspension for each strain prepared. The suspension was adjusted to $1.5 \times 10^8$ cells per ml using McFarland Latex Turbidity Standards. After adjusting the cell concentration, 0.1 ml of the cell suspension was spread uniformly on trypticase soy agar (TSA) plates using spreaders. Reference may be had to Boyan Bonev, James Hooper, Judicaël Parisot; Principles of assessing bacterial susceptibility to antibiotics using the agar diffusion method, Journal of Antimicrobial Chemotherapy, Volume 61, Issue 6, 1 Jun. 2008, Pages 1295-1301, the entire contents of which are incorporated herein by reference.

Formula A was applied to the inoculated TSA plates using a paper disc method. Sterilized filter paper discs were saturated with 0.1 ml of the biocide and then placed on the surface of the inoculated TSA plates. The TSA plates were then incubated at 36° C. for 36 hours. The biocide was also applied to the inoculated TSA plates using a well diffusion method. Using a cork borer size 9 mm, holes were punched on another set of the inoculated TSA agar plates. The holes were then filled with the biocide. The plates were then incubated (upright) at 36° C. for 36 hours.

Figure 2:
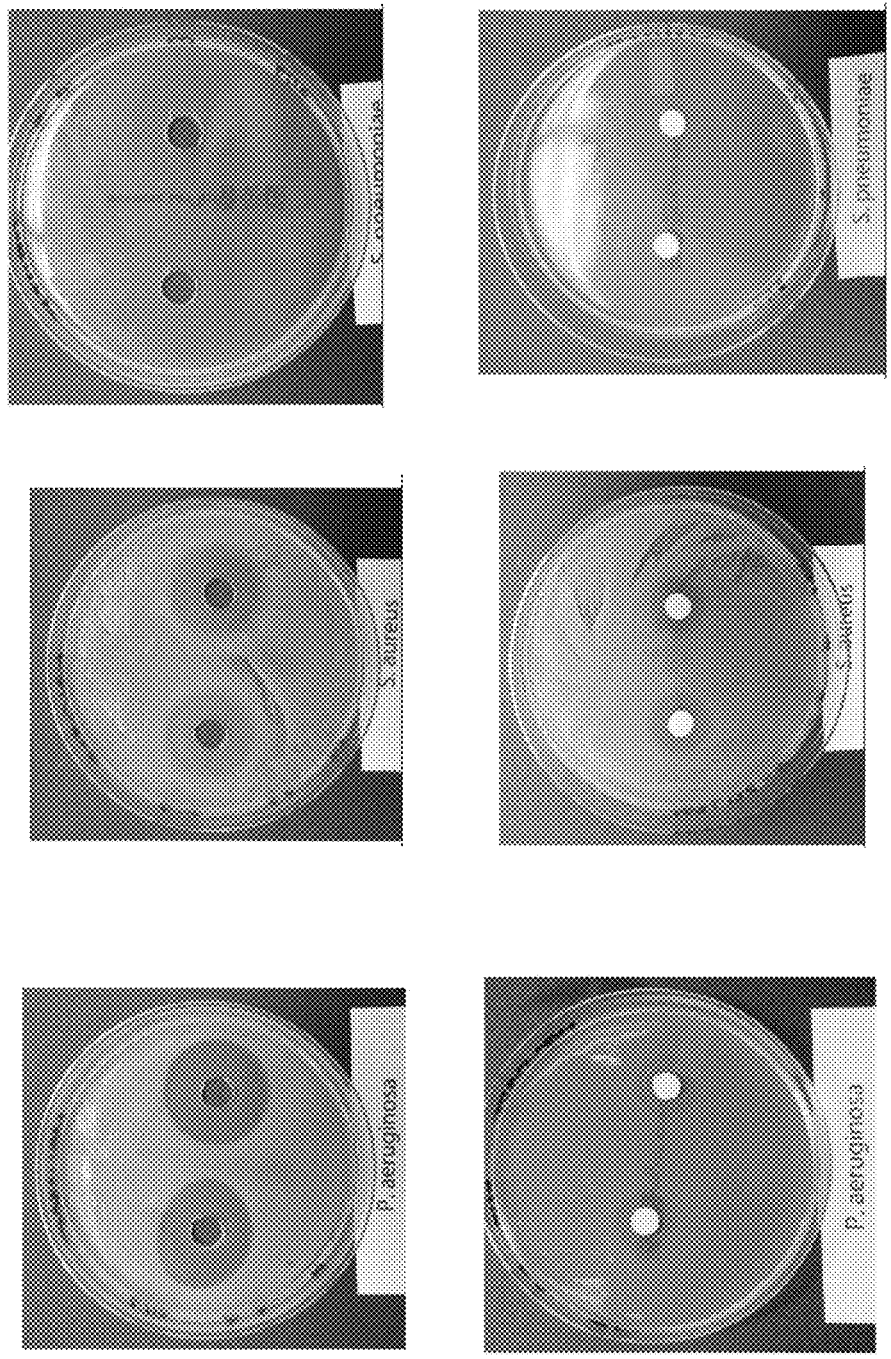
FIG. 2 shows antibacterial efficacy of a biocidal composition described herein using both well diffusion and disk diffusion growth inhibition tests on agar plates.

In each case (FIG. 2), there were clear inhibition zones on the plates treated with the biocide, indicating bacteria being inhibited in the diffusion zone of the biocide.

In another test, effectiveness of the biocide as a preservative was determined. The biocide passed USP requirements for antimicrobial preservative effectiveness not only against bacteria, but also yeast (*Candida*) and a fungus (*Aspergillus*).

| | | | |
|---|---|---|---|
| *E. coli* (ATCC 8739) | $4.56 \times 10^5$ | <1 | <1 |
| *S. aureus* (ATCC 6538) | $8.26 \times 10^5$ | <1 | <1 |
| *P. aeruginosa* (ATCC 9027) | $6.95 \times 10^5$ | <1 | <1 |
| *C. albicans* (ATCC 10231) | $6.08 \times 10^5$ | <1 | <1 |
| *A. brasiliensis* (ATCC 16404) | $4.15 \times 10^5$ | <1 | <1 |

Example 4—Anti-Viral Effectiveness

Formula A was diluted 1:1000 and applied to poliovirus. After 10 minutes, 89% of the viruses were rendered inactive.

| Replicate (Glass Carrier Treated with Spray) | Contact Time | Average pfu/mL Recovered From Each Carrier* | Average Percent Reduction | $\text{Log}_{10}$ reduction |
|---|---|---|---|---|
| 1 | 10 Minutes | $1.1 \times 10^4$ | 88.8% | 0.95 |
| 2 | | $1.2 \times 10^4$ | 87.8% | 0.92 |
| 3 | | $1.2 \times 10^4$ | 87.8% | 0.92 |

-continued

| Replicate (Glass Carrier Treated with Spray) | Contact Time | Average pfu/mL Recovered From Each Carrier* | Average Percent Reduction | Log$_{10}$ reduction |
| --- | --- | --- | --- | --- |
| Control (Unsprayed Glass Carrier)* | | 1.0 × 10$^5$ 9.8 × 10$^4$ | NA | NA |

Each sterile glass carrier was inoculated with 10 microliters of diluted poliovirus stock and allowed to dry. Inoculated carriers were then sprayed to saturation (10 seconds) with the diluted Formula A. The solution was allowed a contact time of 10 minutes. The carriers were eluted in 10 ml of D/E Neutralizing Broth w/Tween. Samples were enumerated for plaque forming units as per EPA methodology (EPA625/R-92/013). Briefly, the eluates were assayed for the presence of infectious virus particles using plaque assay. The samples were analyzed in duplicates of 0.1 and 1.0 mL at various dilutions as per standard lab operating procedures. The positive controls were diluted 1/100 in phosphate buffered water (Weber Scientific) prior to analysis.

The control number represents the number of plaque forming units recovered from a control, non-treated slides that were inoculated, dried and tested as a positive control.

Example 5—Clubroot Fungus Control with Bioassays

In another test, a separate disinfectant was made up with KCl derived electrolyzed water (28 g/liter of KCl prior to electrolysis or about 4800 ppm of free available chlorine after electrolysis) mixed with monoethanolamine (60:40 electrolyzed water:MEA by volume), designated here as AES-2500.

Clubroot galls were collected from canola roots. These galls were then dried and ground in a laboratory mill with a coarse screen. The ground galls were then mixed in distilled water and filtered through cheese cloth to make a spore suspension (spore count of 2.2×10$^8$ spores mL$^{-1}$) and transferred to 5 mL tubes. These tubes were then centrifuged and the water was decanted leaving a pellet of spores. To these spore pellets 1 mL of the disinfectant was added, the spores re-suspended, and incubated at room temperature for 20 min. Subsequently, 9 mL of Universal neutralizer was added to neutralize the disinfectant and then sample was centrifuged again. The spore pellet was then rinsed with sodium phosphate buffer 3 times, and then re-suspended in 5 mL of sodium phosphate buffer. Aliquots of 50 µL of spore suspension were mixed with an equal volume of Evans blue stain and left for 24 hrs at room temperature. This stained suspension was then observed under a compound microscope at 1000× magnification. One hundred resting spores were evaluated for each sample and the results recorded. Resting spores that took up the stain and appeared blue inside were scored as "dead". Treatment samples were compared with negative controls and a standard treatment (bleach) and these values were used to determine the efficacy of each disinfectant treatment.

A bioassay was paired with the Evan's blue samples. Approximately 200 uL of treated spore suspension was used to inoculate canola seedlings. Seedlings were grown in Cone-Tainer™ root trainers in a growth cabinet.

Figure 3:
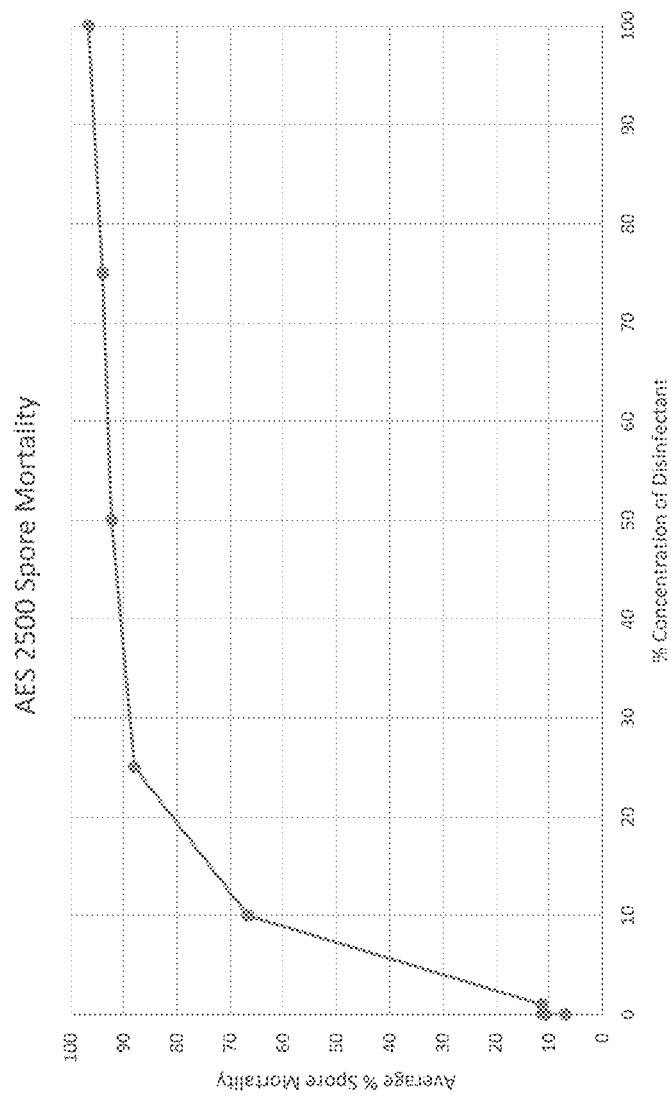
FIG. 3 shows clubroot resting spore mortality due to treatment as measured by Evan's blue staining.
Figure 4:
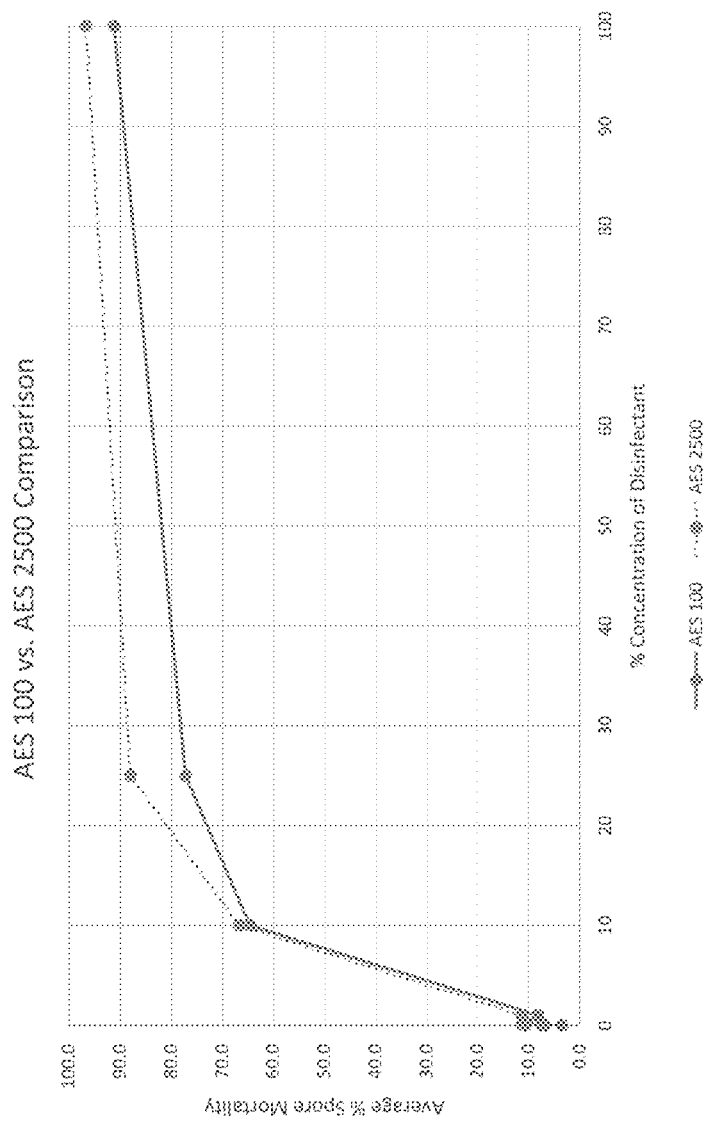
FIG. 4 shows clubroot resting spore mortality due to treatment, and compared with AES 100, as measured by Evan's blue staining.

Resting spore viability was unaffected in the negative control (water) treatment (data not shown). The most effective disinfectant tested to date is sodium hypochlorite (NaOCl, or chlorine bleach) and was used as a positive standard. For NaOCl, all concentrations above 1.5% lead to 100% mortality of clubroot resting spores (not shown). AES-2500 is achieved 90% spore mortality at 40% concentration (FIGS. 3 and 4). AES-100 achieved 80% mortality at 40% concentration, and 90% mortality at full strength.

Figure 5:
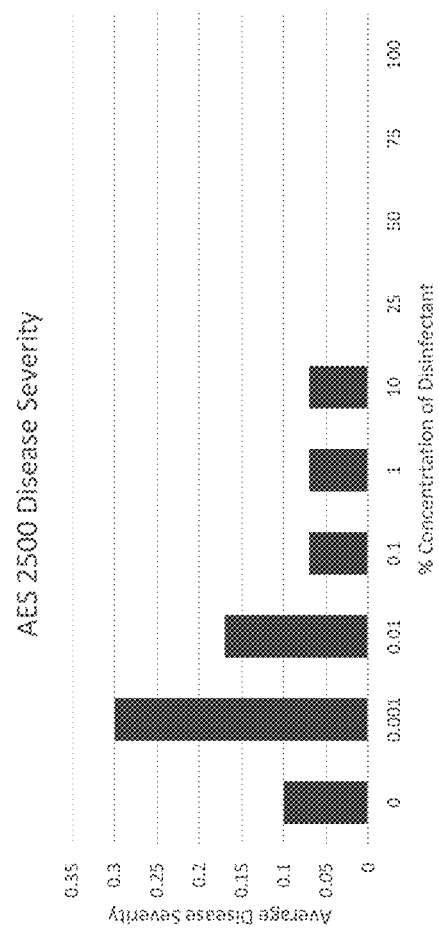
FIG. 5 shows clubroot disease severity on canola due to treatment
Figure 6:
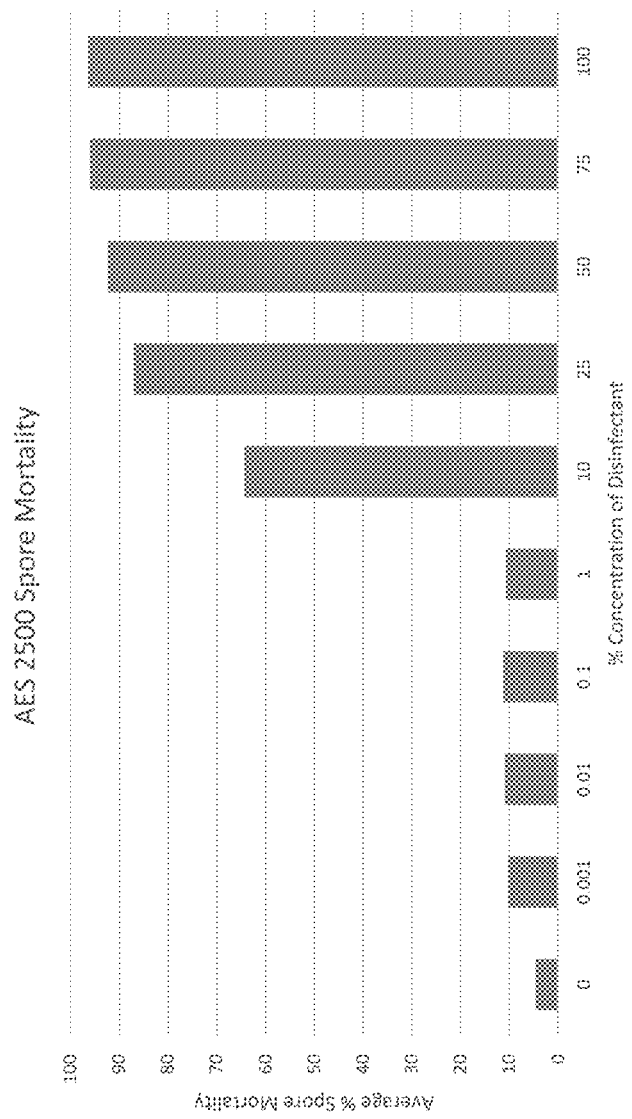
FIG. 6 shows clubroot resting spore mortality due to treatment with as measured by Evan's blue staining.

Due to a number of anomalies in testing, the bioassay was hindered. The bioassay showed a lower severity than the ideal in the control. However, the data collected did give some useful results. Once 70% spore mortality was achieved (FIG. 6) the disease severity in the bioassay dropped to 0, and symptoms were no longer present in the plants (FIG. 5). This result indicates that the Evan's blue staining results are biologically relevant and indicates the efficacy of AES 2500.

Definitions and Interpretation

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated. To the extent that the description is of a specific embodiment or a particular use of the invention, it is intended to be illustrative only, and not limiting of the claimed invention.

All terms and phrases used in this specification have their ordinary meanings as one of skill in the art would understand. Such ordinary meanings may be obtained by reference to technical dictionaries, such as *Hawley's Condensed Chemical Dictionary* 16$^{th}$ Edition, by R. J. Lewis, John Wiley & Sons, New York, N.Y., 2016.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to combine, affect or connect such aspect, feature, structure, or characteristic with other embodiments, whether or not such connection or combination is explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range (e.g., weight percents or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited, and such terms refer to ranges that can be subsequently broken down into sub-ranges as discussed above. In the same manner, all ratios recited herein also include all sub-ratios falling within the broader ratio.

What is claimed is:

1. A method of killing or controlling microorganisms excluding sulfate reducing or hydrogen sulphide producing bacterial species, comprising the step of contacting the microorganism with a composition comprising a reaction product of mixing electrolyzed water and an amine,
    wherein the microorganism is selected from the group consisting of Gram negative bacteria, Gram positive bacteria, *Bacillus*, Corynebacteria, *Clostridium, Listena, Staphylococcus, Streptococcus* species, poliovirus, *Candida, Aspergillus*, clubroot fungus, and algae,
    the Gram negative bacteria excluding *Desulfovibrio* species and comprising *Salmonella, Shigella, Escherichia,* Enterobacteriaceae, *Pseudomonas, Moraxella, Helicobacter Stenotrophomonas, Bdellovibrio*, acetic acid bacteria, *Legionella*, cyanobacteria, or spirochaetes.

2. The method of claim 1 wherein the biocidal composition is diluted prior to use, in water, an aqueous salt solution, an alcohol, or mixtures thereof.

3. The method of claim 2 wherein the electrolyzed water was formed by electrolyzing a potassium chloride solution and/or the amine comprises monoethanolamine.

4. The method of claim 1 wherein the composition is applied to a surface.

5. The method of claim 4 wherein the composition is heated.

6. The method of claim 5 wherein the composition is mixed with water and heated to form steam, which is applied to the surface.

7. The method of claim 1 wherein the electrolyzed water was formed by electrolyzing a potassium chloride solution and/or the amine comprises monoethanolamine.

8. The method of claim 7 wherein the potassium chloride solution comprises a concentration from about 8 g/l to about 28 g/l.

9. A method of preserving a product susceptible to microbial spoilage by *E. coli, P. aeruginosa, C. albicans* or *A. brasiliensis*, comprising applying a biocidal composition comprising a reaction product of electrolyzed water and an amine to the product.

10. A method of controlling a plant disease caused by a clubroot fungus, comprising contacting the plant seeds and/or a growth medium for the plant seeds, with a biocidal composition comprising a reaction product of electrolyzed water and an amine.

11. The method of claim 10 wherein the electrolyzed water was formed by electrolyzing a potassium chloride solution and/or the amine comprises monoethanolamine.

12. The method of claim 11 wherein the potassium chloride solution comprises a concentration from about 8 g/l to about 28 g/l.

* * * * *